United States Patent
Lin et al.

(10) Patent No.: US 12,098,256 B2
(45) Date of Patent: Sep. 24, 2024

(54) RESIN FILM AND USES THEREOF

(71) Applicant: CHANG CHUN PLASTICS CO., LTD., Taipei (TW)

(72) Inventors: Hsuan-Min Lin, Taipei (TW); Chih-Fu Chen, Taipei (TW); An-Pang Tu, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 0 days.

(21) Appl. No.: 18/323,068

(22) Filed: May 24, 2023

(65) Prior Publication Data
US 2024/0092984 A1     Mar. 21, 2024

(30) Foreign Application Priority Data
Sep. 16, 2022   (TW) .................................. 111135100

(51) Int. Cl.
| | |
|---|---|
| *C08J 5/18* | (2006.01) |
| *B32B 15/092* | (2006.01) |
| *B32B 15/20* | (2006.01) |
| *C08G 59/24* | (2006.01) |
| *C08G 73/00* | (2006.01) |
| *C08K 3/04* | (2006.01) |
| *C08K 3/36* | (2006.01) |
| *C08K 7/18* | (2006.01) |

(52) U.S. Cl.
CPC ............... *C08J 5/18* (2013.01); *B32B 15/092* (2013.01); *B32B 15/20* (2013.01); *C08G 59/245* (2013.01); *C08G 73/00* (2013.01); *C08K 3/04* (2013.01); *C08K 3/36* (2013.01); *C08K 7/18* (2013.01); *B32B 2307/732* (2013.01); *B32B 2311/12* (2013.01); *B32B 2457/08* (2013.01); *C08J 2363/00* (2013.01)

(58) Field of Classification Search
CPC ............................ C08J 2363/00; C08L 63/00
See application file for complete search history.

(56) References Cited

U.S. PATENT DOCUMENTS

| | | | | |
|---|---|---|---|---|
| 5,260,121 | A | * 11/1993 | Gardner | ................. C08G 61/02 523/466 |
| 2010/0044090 | A1 | * 2/2010 | Endo | ........................ C08J 5/249 174/250 |

FOREIGN PATENT DOCUMENTS

| | | |
|---|---|---|
| TW | 200914527 A | 4/2009 |
| WO | 2017/122460 A | 7/2017 |

OTHER PUBLICATIONS

Office Action received in Taiwanese Application No. 111135100, dated Jul. 6, 2023.
Office Action received in Japanese Application No. 2023-143370, dated Jan. 16, 2024.
Notice of Allowance received in Taiwanese Application No. 111135100, dated Oct. 13, 2023.

* cited by examiner

*Primary Examiner* — Alicia J Weydemeyer
(74) *Attorney, Agent, or Firm* — Greer, Burns & Crain, Ltd

(57) ABSTRACT

A resin film is provided. When the resin film is characterized by Fourier transform infrared spectroscopy (FTIR), the Fourier transform infrared spectrum of the resin film has a signal intensity A from 2205 $cm^{-1}$ to 2322 $cm^{-1}$ and a signal intensity B from 1472 $cm^{-1}$ to 1523 $cm^{-1}$, and $0.70 \leq A/B \leq 1.95$.

14 Claims, No Drawings

RESIN FILM AND USES THEREOF

CLAIM FOR PRIORITY

This application claims the benefit of Taiwan Patent Application No. 111135100 filed on Sep. 16, 2022, the entire subject matter of which is incorporated herein by reference.

BACKGROUND

Field of the Invention

The present invention provides a resin film, especially a resin film having excellent adhesion to copper foil and heat resistance, and applications of the resin film.

Descriptions of the Related Art

Printed circuit boards (PCBs) can be used as substrates of electronic devices and can load other electronic components and electrically connect the components to provide a stable circuit working environment. Printed circuit boards are primarily made from copper-clad laminates, and copper-clad laminates are formed by superimposing dielectric layers and copper foils, which are used as conductive layers.

With the development of electronic machines and the progression of performance, the configuration of integrated circuits (IC) becomes smaller, lighter, and thinner, and high-density multilayer printed circuit boards are required. As a result, printed circuit boards are desired which have better dimensional stability, and to avoid breakage of wire connection, the dielectric layer of printed circuit boards should be configured to have good adhesion to copper foil and heat resistance.

SUMMARY

A purpose of the present invention is to provide a film material with excellent adhesion to copper foil and heat resistance, which can be used as a dielectric material of a copper-clad laminate. Compared to conventional liquid or powder materials, the film material of the present invention is provided with a uniform thickness, which is advantageous in providing a dielectric material with a large area.

Therefore, an objective of the present invention is to provide a resin film, wherein when the resin film is characterized by Fourier transform infrared spectroscopy (FTIR), the Fourier transform infrared spectrum of the resin film has a signal intensity A from $2205$ $cm^{-1}$ to $2322$ $cm^{-1}$ and a signal intensity B from $1472$ $cm^{-1}$ to $1523$ $cm^{-1}$, and $0.70 \leq A/B \leq 1.95$.

In some embodiments of the present invention, the Fourier transform infrared spectroscopy is performed as follows by using a Fourier transform infrared spectroscopy instrument: placing the resin film in the Fourier transform infrared spectroscopy instrument, measuring an absorption spectrum in a range from $650$ $cm^{-1}$ to $4000$ $cm^{-1}$, and using an attenuated total reflectance method to measure the signal intensities A and B, wherein the resolution of the Fourier transform infrared spectroscopy instrument is $1$ $cm^{-1}$, the scan number of the spectrum is 12, and the signal intensities are the absorbance at respective wavelengths.

In some embodiments of the present invention, the Fourier transform infrared spectrum of the resin film has a signal intensity C from $2943$ $cm^{-1}$ to $2990$ $cm^{-1}$, and $0.05 \leq C/B \leq 0.4$.

In some embodiments of the present invention, the resin film comprises an epoxy resin and a cyanate resin.

In some embodiments of the present invention, the epoxy resin is an epoxy resin with a conjugated unsaturated bond, preferably an aromatic epoxy resin.

In some embodiments of the present invention, the epoxy resin is selected from the group consisting of bisphenol A epoxy resin, bisphenol F epoxy resin, bisphenol S epoxy resin, phenolic epoxy resin, biphenyl epoxy resin, aralkyl epoxy resin, naphthalene epoxy resin, naphthol epoxy resin, epoxides of condensates of phenol and aromatic aldehyde with phenolic hydroxyl groups, biphenyl aralkyl epoxy resin, fluorene epoxy resin, xanthene epoxy resin, dicyclopentadiene epoxy resin, poly(triglycidyl isocyanurate), and combinations thereof.

In some embodiments of the present invention, the cyanate resin is selected from the group consisting of bisphenol A dicyanate, bisphenol E cyanate resin, bisphenol F dicyanate, bisphenol S dicyanate, phenolic cyanate resin, biphenyl dicyanate, biphenol dicyanate, hexafluoro bisphenol A dicyanate, 2,2-bis(4-cyanate)phenyl propane, 1,1-bis (4-cyanate phenyl methane), bis(4-cyanate-3,5-dimethyl phenyl)methane, 1,3-bis(4-cyanate phenyl-1-(methyl ethylidene))benzene, bis(4-cyanate phenyl)sulfide, bis(4-cyanate phenyl)ether, phenolic cyanate resins containing a dicyclopentadiene structure, and combinations thereof.

In some embodiments of the present invention, the resin film further comprises a filler, and the amount of the filler is 70 wt % to 88 wt % based on the solid content of the resin film.

In some embodiments of the present invention, the filler is selected from the group consisting of silica, aluminum oxide, magnesium oxide, magnesium hydroxide, calcium carbonate, talc, clay, aluminum nitride, boron nitride, aluminum hydroxide, silicon aluminum carbide, silicon carbide, sodium carbonate, titanium dioxide, zinc oxide, zirconium oxide, quartz, diamond, diamond-like carbon, graphite, calcined kaolin, pryan, mica, hydrotalcite, polytetrafluoroethylene (PTFE) powders, glass beads, ceramic whiskers, carbon nanotubes, strontium titanate, and combinations thereof.

In some embodiments of the present invention, the resin film further comprises carbon black.

In some embodiments of the present invention, the resin film further comprises a curing accelerator selected from the group consisting of amine-based curing accelerators, guanidine-based curing accelerators, imidazole-based curing accelerators, and combinations thereof.

In some embodiments of the present invention, the resin film has a thickness of 25 μm to 300 μm.

Another objective of the present invention is to provide a copper-clad laminate, which comprises a dielectric layer and a copper foil covering a surface of the dielectric layer, wherein the dielectric layer is provided from the aforementioned resin film.

Another objective of the present invention is to provide a packaging material that comprises the aforementioned resin film.

To render the above objectives, technical features, and advantages of the present invention more apparent, the present invention will be described in detail regarding some specific embodiments hereinafter.

BRIEF DESCRIPTION OF THE DRAWINGS

Not applicable.

DETAILED DESCRIPTION

Hereinafter, some specific embodiments of the present invention will be described in detail. However, the present invention may be embodied in various embodiments and should not be limited to the embodiments described in the specification.

Unless it is additionally explained, the expression "a," "the," or the like recited in the specification, especially in the appended claims, should include both the singular and the plural forms.

Unless it is additionally explained, when describing the components in the solution, mixture, composition, or resin film in the specification, the amount of each component is calculated based on the dry weight, i.e., regardless of the weight of the solvent. For example, when 100 parts by weight of a resin film comprise 20 parts by weight of a solvent and 40 parts by weight of a filler, the solid content of the resin film is 80 parts by weight, and the amount of filler is 50 wt % based on the solid content of the resin film.

1. RESIN FILM

By means of controlling the infrared spectrum signal intensity ratio A/B of the resin film, the present invention can improve the adhesion of the resin film to a metal foil (such as a copper foil) and the heat resistance of the resin film. Detailed descriptions of the resin film of the present invention and uses thereof are provided below.

1.1. Infrared Spectrum Characteristics of the Resin Film

When the resin film of the present invention is characterized by Fourier transform infrared spectroscopy (FTIR), the Fourier transform infrared spectrum of the resin film has a signal intensity A from 2205 $cm^{-1}$ to 2322 $cm^{-1}$ and a signal intensity B from 1472 $cm^{-1}$ to 1523 $cm^{-1}$, and 0.70≤A/B≤1.95. For example, the A/B value can be 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91. 1.92. 1.93. 1.94, or 1.95, or within a range between any two of the values described herein. In some embodiments of the present invention, the ratio of the signal intensity A to the signal intensity B (A/B) is 0.7 to 1.9. The signal intensity A from 2205 $cm^{-1}$ to 2322 $cm^{-1}$ represents the absorption peak of cyanate functional groups, and the signal intensity B from 1472 $cm^{-1}$ to 1523 $cm^{-1}$ represents the absorption peak of carbon-carbon double bonds of benzene rings. Without wishing to be bound by any theories, it is believed that when the A/B value is within the specified range, the higher the A/B value, the higher the tendency to form triazine, and thus the more the —N lone pair electrons, resulting in higher adhesion of the resin film to a copper foil. The lower the A/B value, the lesser the —N lone pair electrons, resulting in lower adhesion of the resin film to a copper foil. However, when the A/B value exceeds the upper limit of the specified range, the resin film becomes brittle due to the excessive amount of triazine and thus cannot effectively adhere to the copper foil.

In some embodiments of the present invention, when the resin film of the present invention is characterized by Fourier transform infrared spectroscopy (FTIR), the Fourier transform infrared spectrum of the resin film further has a signal intensity C from 2943 $cm^{-1}$ to 2990 $cm^{-1}$, and the ratio of the signal intensity C to the signal intensity B (C/B) is 0.05≤C/B≤0.4. For example, the C/B value can be 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, or 0.40, or within a range between any two of the values described herein. The signal intensity C represents the absorption peak of —CH single bonds in the composition. An increase in signal intensity C results in a reduction of the A/B value and vice versa.

The infrared spectrum properties of the resin film of the present invention can be determined as follows by using a Fourier transform infrared spectroscopy instrument: placing the resin film in the Fourier transform infrared spectroscopy instrument, measuring an absorption spectrum in a range from 650 $cm^{-1}$ to 4000 $cm^{-1}$, and using an attenuated total reflectance method to measure the signal intensities A and B, wherein the resolution of the Fourier transform infrared spectroscopy instrument is 1 $cm^{-1}$, the scan number of the spectrum is 12, and the signal intensities are the absorbance at respective wavelengths.

In the present invention, signal intensity is the light absorbance of the resin film within a specific range of wavelength, and the unit thereof is an arbitrary unit (a.u.). The signal intensity A is obtained by calculating the integral area defined with the line connecting the start point and end point of the absorption peak from 2205 $cm^{-1}$ to 2322 $cm^{-1}$ (i.e., the tangent line at the lowest point on both sides of the peak). The signal intensity B is obtained by calculating the integral area defined with the line connecting the start point and end point of the absorption peak from 1472 $cm^{-1}$ to 1523 $cm^{-1}$. The signal intensity C is obtained by calculating the integral area defined with the line connecting the start point and end point of the absorption peak from 2943 $cm^{-1}$ to 2990 $cm^{-1}$.

The A/B value and/or the C/B value of the resin film of the present invention determined by Fourier transform infrared spectroscopy can be adjusted by controlling the resin film's constitution or the resin film's drying conditions. For example, the A/B value and the C/B value can be adjusted by using different resins, curing agents, or curing accelerators. The drying conditions include but are not limited to drying temperature and drying time. Persons having ordinary skill in the art of the present invention can select suitable constitution or conditions to obtain the desired A/B value and C/B value based on the disclosure of the specification of the subject application and their ordinary skill.

1.2. Components of the Resin Film 1.2.1. Epoxy Resin and Cyanate Resin

With the premise that the A/B value determined by Fourier transform infrared spectroscopy satisfies 0.70≤A/B≤1.95, the constitution of the resin film can be adjusted depending on needs. In some embodiments of the present invention, the resin film comprises an epoxy resin and cyanate resin as the resin component of the resin film, or the resin component of the resin film consists essentially of epoxy resin and cyanate resin, or the resin component of the resin film consists of epoxy resin and cyanate resin. The expression "the resin component of the resin film consist essentially of epoxy resin and cyanate resin" means that based on the total weight of the resin component of the resin film, the total amount of the epoxy resin and cyanate resin is at least 80 wt %, and more specifically, at least 85 wt %. For example, based on the total weight of the resin component of the resin film, the total amount of the epoxy resin and cyanate resin can be 85 wt %, 86 wt %, 87 wt %, 88 wt %, 89 wt %, 90 wt %, 91 wt %, 92 wt %, 92 wt %, 94 wt %, 95 wt %, 96 wt %, 97 wt %, 98 wt %, or 99 wt %.

The epoxy resin can be an epoxy resin with a conjugated unsaturated bond(s), including an aliphatic epoxy resin with a conjugated unsaturated bond(s) and an aromatic epoxy resin with conjugated unsaturated bonds, and the preference is given to an aromatic epoxy resin with conjugated unsaturated bonds. Examples of the epoxy resin include but are not limited to bisphenol A epoxy resin, bisphenol F epoxy resin, bisphenol S epoxy resin, phenolic epoxy resin (alkyl phenolic epoxy resin), biphenyl epoxy resin, aralkyl epoxy resin, naphthalene epoxy resin, naphthol epoxy resin, epoxides of condensates of phenol and aromatic aldehyde with phenolic hydroxyl groups, biphenyl aralkyl epoxy resin, fluorene epoxy resin, xanthene epoxy resin, dicyclopentadiene epoxy resin, and poly(triglycidyl isocyanurate). The aforementioned epoxy resins can be used alone or in any combination. In some embodiments of the present invention, the resin film comprises naphthalene epoxy resin and biphenyl epoxy resin.

Examples of commercially available epoxy resin products that can be used in the resin film of the present invention include but are not limited to BE188 available from Chang Chun Plastics Company, BFE170 available from Chang Chun Plastics Company, NC-3000 series of epoxy resin available from Nippon Kayaku Corporation, jER® YX series of epoxy resin available from Mitsubishi Chemical Company, EPICLON® HP-4032 epoxy resin available from DIC Company, and SE80 series of epoxy resin available from SHIN-A T&C Company.

Examples of cyanate resin include but are not limited to bisphenol A dicyanate, bisphenol E cyanate resin, bisphenol F dicyanate, bisphenol S dicyanate, phenolic cyanate resin, biphenyl dicyanate, biphenol dicyanate, hexafluoro bisphenol A dicyanate, 2,2-bis(4-cyanate)phenyl propane, 1,1-bis(4-cyanate phenyl methane), bis(4-cyanate-3,5-dimethyl phenyl)methane, 1,3-bis(4-cyanate phenyl-1-(methyl ethylidene))benzene, bis(4-cyanate phenyl)sulfide, bis(4-cyanate phenyl)ether, and phenolic cyanate resins containing a dicyclopentadiene structure. The aforementioned cyanate resins can be used alone or in any combination. In some embodiments of the present invention, the resin film comprises bisphenol E cyanate resin and phenolic cyanate resin.

Examples of commercially available cyanate resin products that can be used in the resin film of the present invention include but are not limited to BA-230S available from LONZA Corporation, PT-S60 available from LONZA Corporation, LVT-50 available from LONZA Corporation, PT30 available from LONZA Corporation, and LECy available from LONZA Corporation, wherein BA-230S and LECy are bisphenol cyanate resins, and PT-S60, LVT-50 and PT30 are phenolic cyanate resins.

It is found that the A value of the resin film can be adjusted by adjusting the amount of the —OCN bonds contained in the cyanate resin, the B value of the resin film can be adjusted by adjusting the amount of the conjugated unsaturated carbon-carbon bonds contained in the epoxy resin, and the C value of the resin film can be adjusted by adjusting the amount of the methyl contained in the cyanate resin and the epoxy resin. Therefore, the A/B value and the C/B value of the resin film can be controlled at least by adjusting the aforementioned parameters.

With the premise that the A/B value of the resin film is within the specified range, the amount of the epoxy resin in the resin film can be adjusted depending on needs. For example, based on the solid content of the resin film, the amount of the epoxy resin can be 2 wt % to 25 wt %. For example, based on the solid content of the resin film, the amount of the epoxy resin can be 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, or 25 wt %, or within a range between any two of the values described herein. In some embodiments of the present invention, based on the solid content of the resin film, the amount of the epoxy resin is 5 wt % to 18 wt %.

With the premise that the A/B value of the resin film is within the specified range, the amount of the cyanate resin in the resin film can be adjusted according to needs. For example, based on the solid content of the resin film, the amount of the cyanate resin can be 1 wt % to 25 wt %. For example, based on the solid content of the resin film, the amount of the cyanate resin can be 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt % 21 wt %, 22 wt %, 23 wt %, 24 wt %, or 25 wt %, or within a range between any two of the values described herein. In some embodiments of the present invention, based on the solid content of the resin film, the amount of the cyanate resin is 1 wt % to 19 wt %.

1.2.2. Filler

In some embodiments of the present invention, the resin film further comprises a filler to adaptively improve the mechanical strength, heat conductivity, and dimensional stability of the resin film.

Examples of suitable fillers include but are not limited to silica (including hollow silica, spherical silica sand, etc.), aluminum oxide, magnesium oxide, magnesium hydroxide, calcium carbonate, talc, clay, aluminum nitride, boron nitride, aluminum hydroxide, silicon aluminum carbide, silicon carbide, sodium carbonate, titanium dioxide, zinc oxide, zirconium oxide, quartz, diamond, diamond-like carbon, graphite, calcined kaolin, pryan, mica, hydrotalcite, polytetrafluoroethylene (PTFE) powders, glass beads, ceramic whiskers, carbon nanotubes, and strontium titanate. The aforementioned fillers can be used alone or in any combination.

The shape of the filler is not particularly limited. For example, the filler can have a spherical shape, fibrous shape, plate shape, granular shape, flake shape, needle shape, etc., but the present invention is not limited thereto. Furthermore, the size of the filler is also not particularly limited. For example, in the case of spherical or granular fillers, the average particle size of the filler can be less than 10 μm, preferably between 0.1 μm to 5 μm.

In addition, to improve the compatibility of the filler with other components of the resin film, the filler can be subjected to surface modification with a coupling agent before being added to the resin film. Examples of the coupling agent include but are not limited to a silane coupling agent, a titanate coupling agent, and polysiloxane with a low polymerization degree.

The amount of the filler can be adjusted depending on needs. In general, based on the solid content of the resin film, the amount of the filler can be 50 wt % to 90 wt %. For example, based on the solid content of the resin film, the amount of the filler can be 50 wt %, 51 wt %, 52 wt %, 53 wt %, 54 wt %, 55 wt %, 56 wt %, 57 wt %, 58 wt %, 59 wt %, 60 wt %, 61 wt % 62 wt %, 63 wt %, 64 wt %, 65 wt %, 66 wt %, 67 wt %, 68 wt %, 69 wt %, 70 wt %, 71 wt % 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, or 90 wt %, or within a range between any two of the values described herein. In the preferred embodiments of the present invention, to meet the high dimensional stability requirement of a multilayer printed circuit board, the amount of the filler is preferably 70 wt % to 88 wt % based on the solid content of the resin film. When the amount of the filler is within the specified range, the resin film can have excellent dimensional stability; more specifically, the resin film is outstanding in terms of coefficient of thermal expansion and warpage.

1.2.3. Other Optional Components

The resin film of the present invention can further comprise other optional components to adaptively improve the processibility of the resin film during production or to improve the physicochemical properties of the prepared dielectric material. Examples of the optional components include but are not limited to solvents, curing accelerators, elastomers, flame retardants, and additives known in the art. Examples of elastomers include but are not limited to polybutadiene, polyisoprene, and styrene-alkene copolymers. Examples of flame retardants include but are not limited to phosphorus-containing flame retardants and bromine-containing flame retardants. Examples of solvents include but are not limited to toluene, γ-butyrolactone, methyl ethyl ketone, cyclohexanone, butanone, acetone, xylene, methyl isobutyl ketone, N,N-dimethyl formamide (DMF), N,N-dimethyl acetamide (DMAc), and N-methylpyrolidone (NMP). Examples of curing accelerators include but are not limited to amine-based curing accelerators (DE-TDA-80), guanidine-based curing accelerators, and imidazole-based curing accelerators. Examples of additives known in the art include but are not limited to carbon black, dispersing agents, toughener, viscosity modifiers, thixotropic agents, defoaming agents, leveling agents, surface modifying agents, stabilizers, and antioxidants. The optional components can be used alone or in any combination.

In some embodiments of the present invention, the resin film further comprises a solvent, and based on the total weight of the resin film, the amount of the solvent can be 3 wt % to 16 wt %. For example, based on the total weight of the resin film, the amount of the solvent can be 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, or 16 wt %, or within a range between any two of the values described herein.

In some embodiments of the present invention, the resin film further comprises carbon black, and based on the solid content of the resin film, the amount of carbon black can be 0.1 wt % to 1 wt %. For example, based on the solid content of the resin film, the amount of carbon black can be 0.1 wt %, 0.15 wt %, 0.2 wt %, 0.25 wt %, 0.3 wt %, 0.35 wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 0.95 wt %, or 1 wt %, or within a range between any two of the values described herein. Using carbon black can render the resin film of the present invention black, which is favorable for effective shielding wiring design in the wiring packaging built-up process.

In some embodiments of the present invention, the resin film further comprises a curing accelerator to facilitate the curing reaction and lower the resin composition's curing reaction temperature. The amount of the curing accelerator is not particularly limited. In general, based on the solid content of the resin film, the amount of the curing accelerator can be 0.1 wt % to 3 wt %. For example, based on the solid content of the resin film, the amount of the curing accelerator can be 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.4 wt %, 2.5 wt %, 2.6 wt %, 2.7 wt %, 2.8 wt %, 2.9 wt %, or 3 wt %, or within a range between any two of the values described herein.

1.3. Other Properties of the Resin Film

The resin film of the present invention is semi-cured film (B-stage). That is, the resin film is dry-baked to contain no solvent or only a small amount of solvent, and the resin component of the resin film may have a certain degree of oligomerization but is not completely cured. The resin film of the present invention is provided with a uniform thickness, which is advantageous in providing a dielectric material with a large area. The resin film of the present invention also has excellent adhesion to copper foil and heat resistance. Furthermore, the resin film can have excellent dimensional stability in the preferred embodiments where the resin film contains a high amount of filler.

In some embodiments of the present invention, the resin film can have a thickness of 25 μm to 300 μm. For example, the resin film can have a thickness of 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 105 μm, 110 μm, 115 μm, 120 μm, 125 μm, 130 μm, 135 μm, 140 μm, 145 μm, 150 μm, 155 μm, 160 μm, 165 μm, 170 μm, 175 μm, 180 μm, 185 μm, 190 μm, 195 μm, 200 μm, 205 μm, 210 μm, 215 μm, 220 μm, 225 μm, 230 μm, 235 μm, 240 μm, 245 μm, 250 μm, 255 μm, 260 μm, 265 μm, 270 μm, 275 μm, 280 μm, 285 μm, 290 μm, 295 μm, or 300 μm, or within a range between any two of the values described herein. The thickness can be adjusted depending on the needs.

1.4. Preparation of the Resin Film

The preparation method of the resin film of the present invention is not particularly limited. Persons having ordinary skill in the art can practice the preparation of the resin film based on the disclosure of the specification of the subject application.

For example, the resin film of the present invention can be prepared as follows: evenly mixing each of the raw materials of the resin film, including a resin component, filler, and optional components, with a stirrer and dissolving or dispersing the components in a solvent to obtain a homogeneous solution; coating the homogeneous solution uniformly on a carrier film; and conducting drying under an appropriate drying temperature for an appropriate period of drying time to obtain a semi-cured resin film. The solvent can be any inert solvent that can dissolve or disperse the raw materials of the resin film but does not react with the raw materials. Examples of the solvent have been described above.

It is found that the degree of reaction of the components of the resin film and thus the A/B value and C/B value can be influenced by the drying temperature and drying time. Therefore, the A/B value of the resin film can also be adjusted by controlling the drying temperature and the drying time. In some embodiments of the present invention, the drying temperature can be 80° C. to 120° C. For example, the drying temperature can be 80° C., 85° C., 90° C., 95° C., 100° C., 105° C., 110° C., 115° C., or 120° C., or within a range between any two of the values described herein. In some embodiments of the present invention, the drying time can be 5 min to 25 min. For example, the drying time can be 5 min, 6 min, 7 min, 8 min, 9 min, 10 min, 11 min, 12 min, 13 min, 14 min, 15 min, 16 min, 17 min, 18 min, 19 min, 20 min, 21 min, 22 min, 23 min, 24 min, or 25 min, or within a range between any two of the values described herein.

After the preparation of the resin film of the present invention is completed, the resin film can be placed at room temperature and subjected to an FTIR analysis within 2 days to determine its FTIR characteristics. Alternatively, if an FTIR analysis cannot be timely conducted, the resin film can be stored at 0° C. to −40° C. then placed at room temperature to warm up to room temperature and subjected to an FTIR analysis within 2 days.

Exemplary preparation steps for the resin film of the present invention are described in more detail in the Examples provided below.

2. APPLICATIONS OF THE RESIN FILM

The resin film of the present invention can be used as a dielectric material of a printed circuit board (PCB). Therefore, the present invention also provides a copper-clad laminate, which comprises a dielectric layer and a copper foil covering a surface of the dielectric layer, wherein the dielectric layer is provided from the resin film of the present invention. Specifically, the copper-clad laminate of the present invention can be prepared by the following method: using one resin film or multiple superimposed resin films as a dielectric layer; superimposing a copper foil on at least one external surface of the dielectric layer to provide a superimposed object comprising the dielectric layer and the copper foil; and performing a hot-pressing operation to the superimposed object to obtain a metal-clad laminate.

In addition, the resin film of the present invention can also be used in packaging. Therefore, the present invention also provides a packaging material, comprising the aforementioned resin film.

3. EXAMPLES

3.1. Testing Methods

The present invention is further illustrated by the embodiments hereinafter, wherein the testing instruments and methods are as follows.

[Infrared Spectroscopy Test]

The prepared dry resin film with a thickness of 160 μm is cut into a 5 cm×5 cm sample. The sample is placed in a Fourier transform infrared spectroscopy instrument; an absorption spectrum in a range from 650 $cm^{-1}$ to 4000 $cm^{-1}$ is measured; and an attenuated total reflectance method is used to measure the signal intensity A from 2205 $cm^{-1}$ to 2322 $cm^{-1}$, the signal intensity B from 1472 $cm^{-1}$ to 1523 $cm^{-1}$ and the signal intensity C from 2943 $cm^{-1}$ to 2990 $cm^{-1}$. The resolution of the Fourier transform infrared spectroscopy instrument is 1 $cm^{-1}$; the scan number of the spectrum is 12; and the signal intensities are the absorbance at respective wavelengths (a.u.). The calculation method is to calculate the integral area defined by a line connecting the start point and end point of a peak within a specified range (i.e., the tangent line at the lowest point on both sides of the peak). The machine software PerkinElmer Spectrum Ver 10.5.3 is used to calculate the integral area.

[Adhesion to the Copper Foil Test]

The prepared dry resin film is placed under 85° C. to 120° C. and pressed on a treated surface of a 1 oz electrolytic copper foil (Chang Chun copper foil, Grade: PLS) with a surface pressure of 5 to 10 $kgf/cm^2$, and then subjected to an aging process in an oven at 180° C. for 3 hours to obtain a copper-clad laminate (1).

The copper-clad laminate (1) is placed in a chamber for a pressure cooker test and subjected to a temperature of 120° C. and a pressure of 0.2 MPa for 48 hours to obtain a copper-clad laminate (2).

The copper-clad laminate (1) and the copper-clad laminate (2) are each cut into a size of 10 cm×3.5 cm (MD direction×TD direction). The adhesive surfaces of each copper-clad laminate are attached to a bonding sheet and a polypropylene sheet then pressed at 185° C. with a pressure of 100 $kgf/cm^2$ for 120 s. Afterward, the copper-clad laminates (1) and (2) are subjected to an aging process at 170° C. for 1 hour and then attached to a 3.5 mm hardly-etched tape to perform a wet etching to obtain a sample (1) and a sample (2), respectively.

The tensile strengths of samples (1) and (2) are tested according to IPC-TM-650 testing method 2.4.9. If the tensile force is greater than 0.7 $kgf/cm^2$, the result is recorded as "O"; if the tensile force is 0.5 to 0.7 $kgf/cm^2$, the result is recorded as "Δ"; and if the tensile force is smaller than 0.5 $kgf/cm^2$, the result is recorded as "X".

[Glass Transition Temperature and Coefficient of Thermal Expansion Tests]

The prepared resin film is placed in an oven at 180° C. to be aged for 3 hours to obtain a cured product. The cured product is cut into a 5 mm×15 mm sample, and the sample is analyzed using a thermal mechanical analyzer (TMA) (available from TA Company) according to a tensile weighting method. After the sample is placed in the thermal mechanical analyzer, measurement is conducted continuously two times under the following testing conditions: the stress is 50 mN, the heating rate is 10° C./min, the testing temperature range is from room temperature to 280° C., and the measurement is conducted continuously two times. The glass transition temperature (Tg), the average linear coefficient of thermal expansion CTE 1 from 50° C. to 120° C., and the average linear coefficient of thermal expansion CTE 2 from 180° C. to 240° C. are recorded. The unit of the linear coefficient of thermal expansion is ppm/° C. The higher the glass transition temperature of the resin film, the better the heat resistance. In addition, the lower the coefficient of thermal expansion of the resin film, the better the dimensional stability.

[Warpage Test]

The prepared dry resin film with a thickness of 160 μm is cut into a 10 cm×25 cm sample. The sample is placed in an oven (C-SUN Company, model number: SM0-1B) to be aged at 150° C. for 4 hours. The warpage on the edge of the aged sample in the transverse direction (TD) is measured. The calculation method is to calculate the distance from the horizontal surface to the highest point of the warped edge of the sample. If the warpage is smaller than 2 cm, the result is recorded as "O"; if the warpage is 2 to 3 cm, the result is recorded as "Δ"; and if the warpage is greater than 3 cm or the resin film is broken, the result is recorded as "X". A high warpage value (the distance of warping is longer) or breakage of the resin film indicates poor dimensional stability.

[Gel Time Test]

1 to 2 g of the resin film is placed on a hot plate at 150° C. While the resin film is moved using a strickle, the time GT past when the fluidity is lost is measured.

3.2. Preparation of the Resin Film

Example 1

Using a planetary mixer (model number: ARV-310), 4.31 wt % of naphthalene epoxy resin (model number: EPICLON® HP-4032, available from DIC Company), 3.08 wt % of biphenyl epoxy resin (model number: NC-3000, available from Nippon Kayaku Corporation), 9.67 wt % of bisphenol E cyanate resin (model number: LECy, available from LONZA Corporation), 4.16 wt % of phenolic cyanate resin (model number: PT30, available from LONZA Corporation), 0.41 wt % of amine-based curing accelerator, 0.37 wt % of carbon black, and 78.00 wt % of spherical silica sand filler (all of the above are based on solid content) were mixed and dispersed with a three-roll milling machine, and a solvent was added to it to form a homogeneous solution. The amount of the solvent is 9.04 parts by weight per 100 parts by weight of the solid content.

The homogeneous solution was coated evenly on a PET carrier film. The wet film was scraped with a wire-wound rod and a coating rod. After that, the wet film was dried in an oven at 100° C. for 10 min to obtain a semi-cured resin film, and the forming result of the resin film was observed.

Example 2

The preparation procedures of Example 1 were repeated to prepare the resin film, except that the amounts of the components were adjusted as follows: 5.75 wt % of naphthalene epoxy resin, 4.11 wt % of biphenyl epoxy resin, 7.94 wt % of bisphenol E cyanate resin, 3.42 wt % of phenolic cyanate resin, 0.41 wt % of amine-based curing accelerator, 0.37 wt % of carbon black, 78.00 wt % of spherical silica sand filler (all of the above are based on solid content), and 11.29 parts by weight of solvent per 100 parts by weight of the solid content. In addition, the drying time was adjusted to 5 min.

Example 3

The preparation procedures of Example 1 were repeated to prepare the resin film, expect that the amounts of the components were adjusted as follows: 9.52 wt % of naphthalene epoxy resin, 6.81 wt % of biphenyl epoxy resin, 3.42 wt % of bisphenol E cyanate resin, 1.47 wt % of phenolic cyanate resin, 0.41 wt % of amine-based curing accelerator, 0.37 wt % of carbon black, 78.00 wt % of spherical silica sand filler (all of the above are based on solid content), and 9.28 parts by weight of solvent per 100 parts by weight of the solid content. In addition, the drying time was adjusted to 5 min.

Example 4

The preparation procedures of Example 1 were repeated to prepare the resin film, expect that the amounts of the components were adjusted as follows: 7.50 wt % of naphthalene epoxy resin, 5.35 wt % of biphenyl epoxy resin, 10.36 wt % of bisphenol E cyanate resin, 4.46 wt % of phenolic cyanate resin, 0.46 wt % of amine-based curing accelerator, 0.54 wt % of carbon black, 71.33 wt % of spherical silica sand filler (all of the above are based on solid content), and 9.95 parts by weight of solvent per 100 parts by weight of the solid content. In addition, the drying temperature was adjusted to 120° C.

Example 5

The preparation procedures of Example 1 were repeated to prepare the resin film, expect that the amounts of the components were adjusted as follows: 5.87 wt % of naphthalene epoxy resin, 4.19 wt % of biphenyl epoxy resin, 8.11 wt % of bisphenol E cyanate resin, 3.49 wt % of phenolic cyanate resin, 0.40 wt % of amine-based curing accelerator, 0.54 wt % of carbon black, 77.40 wt % of spherical silica sand filler (all of the above are based on solid content), and 12.00 parts by weight of solvent per 100 parts by weight of the solid content. In addition, the drying temperature was adjusted to 120° C., and the drying time was adjusted to 5 min.

Example 6

The preparation procedures of Example 1 were repeated to prepare the resin film, expect that the amounts of the components were adjusted as follows: 3.53 wt % of naphthalene epoxy resin, 2.48 wt % of biphenyl epoxy resin, 4.85 wt % of bisphenol E cyanate resin, 2.09 wt % of phenolic cyanate resin, 0.20 wt % of amine-based curing accelerator, 0.54 wt % of carbon black, 86.31 wt % of spherical silica sand filler (all of the above are based on solid content), and 15.15 parts by weight of solvent per 100 parts by weight of the solid content. In addition, the drying temperature was adjusted to 120° C.

Example 7

The preparation procedures of Example 1 were repeated to prepare the resin film, expect that the amounts of the components were adjusted as follows: 10.21 wt % of naphthalene epoxy resin, 7.28 wt % of biphenyl epoxy resin, 14.10 wt % of bisphenol E cyanate resin, 6.07 wt % of phenolic cyanate resin, 0.40 wt % of amine-based curing accelerator, 0.54 wt % of carbon black, 61.40 wt % of spherical silica sand filler (all of the above are based on solid content), and 5.70 parts by weight of solvent per 100 parts by weight of the solid content. In addition, the drying temperature was adjusted to 120° C., and the drying time was adjusted to 25 min.

Example 8

The preparation procedures of Example 1 were repeated to prepare the resin film, expect that the amounts of the components were adjusted as follows: 8.82 wt % of naphthalene epoxy resin, 6.30 wt % of biphenyl epoxy resin, 12.19 wt % of bisphenol E cyanate resin, 5.25 wt % of phenolic cyanate resin, 0.55 wt % of amine-based curing accelerator, 0.54 wt % of carbon black, 66.35 wt % of spherical silica sand filler (all of the above are based on solid content), and 9.09 parts by weight of solvent per 100 parts by weight of the solid content. In addition, the drying temperature was adjusted to 120° C., and the drying time was adjusted to 5 min.

Comparative Example 1

The preparation procedures of Example 1 were repeated to prepare the resin film, expect that the amounts of the components were adjusted as follows: 2.60 wt % of naphthalene epoxy resin, 1.87 wt % of biphenyl epoxy resin, 11.71 wt % of bisphenol E cyanate resin, 5.04 wt % of phenolic cyanate resin, 0.41 wt % of amine-based curing accelerator, 0.37 wt % of carbon black, 78.00 wt % of spherical silica sand filler (all of the above are based on solid content), and 10.44 parts by weight of solvent per 100 parts by weight of the solid content.

Comparative Example 2

The preparation procedures of Example 1 were repeated to prepare the resin film, expect that the amounts of the components were adjusted as follows: 10.75 wt % of naphthalene epoxy resin, 7.71 wt % of biphenyl epoxy resin, 1.93 wt % of bisphenol E cyanate resin, 0.83 wt % of phenolic cyanate resin, 0.41 wt % of amine-based curing accelerator, 0.37 wt % of carbon black, 78.00 wt % of spherical silica sand filler (all of the above are based on solid content), and 12.73 parts by weight of solvent per 100 parts by weight of the solid content. In addition, the drying time was adjusted to 5 min.

Comparative Example 3

The preparation procedures of Example 1 were repeated to prepare the resin film, expect that the amounts of the components were adjusted as follows: 2.15 wt % of naphthalene epoxy resin, 1.53 wt % of biphenyl epoxy resin, 2.97 wt % of bisphenol E cyanate resin, 1.28 wt % of phenolic cyanate resin, 0.20 wt % of amine-based curing accelerator, 0.54 wt % of carbon black, 91.33 wt % of spherical silica sand filler (all of the above are based on solid content), and 17.15 parts by weight of solvent per 100 parts by weight of the solid content. In addition, the drying temperature was adjusted to 120° C., and the drying time was adjusted to 5 min.

Comparative Example 4

The preparation procedures of Example 1 were repeated to prepare the resin film, expect that the amounts of the components were adjusted as follows: 5.88 wt % of naphthalene epoxy resin, 4.19 wt % of biphenyl epoxy resin, 8.11 wt % of bisphenol E cyanate resin, 3.49 wt % of phenolic cyanate resin, 0.40 wt % of amine-based curing accelerator, 0.54 wt % of carbon black, 77.39 wt % of spherical silica sand filler (all of the above are based on solid content), and 11.58 parts by weight of solvent per 100 parts by weight of the solid content. In addition, the drying temperature was adjusted to 140° C., and the drying time was adjusted to 5 min.

The forming results of Examples 1 to 8 and Comparative Examples 1 to 4 are tabulated in Table 1-1.

TABLE 1-1

|  | Example 1 | Example 2 | Example 3 | Example 4 | Example 5 | Example 6 |
|---|---|---|---|---|---|---|
| Forming result | good | good | good | good | good | good |

|  | Example 7 | Example 8 | Comparative Example 1 | Comparative Example 2 | Comparative Example 3 | Comparative Example 4 |
|---|---|---|---|---|---|---|
| Forming result | good | good | good | broken | broken | poor |

As shown in Table 1-1, the forming results of the resin films of Examples 1 to 8 are good. On the other hand, the forming results of Comparative Examples 2 to 4 failed or are poor.

3.3. Tests of the Resin Film

The characteristics or properties of the resin films of Examples 1 to 8 and Comparative Examples 1 to 4, including infrared spectroscopy signal intensities, adhesion to copper foil, glass transition temperature, coefficient of thermal expansion, warpage, and gel time, were tested according to the aforementioned testing methods, and the results are tabulated in Table 2-1 and Table 2-2.

TABLE 2-1

|  | Example 1 | Example 2 | Example 3 | Example 4 | Example 5 | Example 6 |
|---|---|---|---|---|---|---|
| Signal intensity A | 966.8 | 412.94 | 169.99 | 555.34 | 303.75 | 117.84 |
| Signal intensity B | 512.17 | 301.48 | 238.65 | 404.65 | 270.75 | 111.52 |
| Signal intensity C | 37.73 | 90.45 | 89.63 | 20.54 | 47.51 | 18.73 |
| A/B value | 1.89 | 1.37 | 0.71 | 1.37 | 1.12 | 1.07 |
| C/B value | 0.07 | 0.3 | 0.38 | 0.05 | 0.18 | 0.17 |
| Amount of filler (wt %) | 78% | 78% | 78% | 71.33% | 77.40% | 86.31% |
| Adhesion to copper foil  Sample (1) | ○ | ○ | ○ | ○ | ○ | ○ |
| Adhesion to copper foil  Sample (2) | ○ | ○ | ○ | ○ | ○ | ○ |
| Tg (° C.) | 141 | 135 | 135 | 135 | 142 | 138 |
| CTE 1 (ppm/° C.) | 17 | 17 | 19.4 | 18.6 | 13.9 | 9.1 |
| CTE 2 (ppm/° C.) | 73.2 | 65.6 | 74.3 | 77.5 | 56 | 33.4 |
| Warpage | ○ | ○ | Δ | Δ | ○ | ○ |
| GT (min'sec") | 3'30" | 3'44" | 2'25" | 3'27" | 3'18" | 3'02" |

TABLE 2-2

|  |  | Example 7 | Example 8 | Comparative Example 1 | Comparative Example 2 | Comparative Example 3 | Comparative Example 4 |
|---|---|---|---|---|---|---|---|
| Signal intensity A | | 617.21 | 479.23 | 1130.62 | 36.15 | 13.09 | 9.09 |
| Signal intensity B | | 489.41 | 392.15 | 545.32 | 136.01 | 21.79 | 24.61 |
| Signal intensity C | | 25.06 | 45.13 | 47.17 | 100.74 | 2.52 | 0.83 |
| A/B value | | 1.26 | 1.22 | 2.07 | 0.27 | 0.6 | 0.37 |
| C/B value | | 0.05 | 0.12 | 0.09 | 0.74 | 0.12 | 0.03 |
| Amount of filler (wt %) | | 61.40% | 66.35% | 78% | 78% | 91.33% | 77.40% |
| Adhesion to copper foil | Sample (1) | ○ | ○ | Δ | X | X | X |
| | Sample (2) | ○ | ○ | X | X | X | X |
| Tg (° C.) | | 150 | 130 | 137 | 94 | 89 | 130.18 |
| CTE 1 (ppm/° C.) | | 25.3 | 21.3 | 15.6 | 14.9 | 0.9 | 13.2 |
| CTE 2 (ppm/° C.) | | 101.2 | 91.2 | 49.7 | 35.6 | 5.9 | 53.4 |
| Warpage | | X | X | X | X | X | X |
| GT (min'sec") | | 4'14" | 3'08" | 4'05" | NA | NA | 3'35" |

*NA means that the fluidity is extremely poor, and the gel test cannot be performed.

As shown in Table 2-1 and Table 2-2, the resin films of Examples 1 to 8 of the present invention have excellent adhesion to copper foil and high glass transition temperature, meaning that the heat resistance is excellent. By contrast, Comparative Example 1 shows that when the A/B value is higher than 1.95, the adhesion to copper foil is poor, and Comparative Example 2 to Comparative Example 4 show that when the A/B value is lower than 0.70, the adhesion to copper foil is poor and the glass transition temperature is low, meaning that the heat resistance is poor. In particular, the comparison between Example 5 and Comparative Example 4 shows that even though raw materials of the resin films are identical, when the drying conditions are adjusted to have a A/B value lower than 0.70, the efficacy of the present invention cannot be obtained. This demonstrates that the technical feature regarding A/B value is one of the special technical features for achieving inventive efficacy. In addition, the comparison between Examples 1 to 6 and Examples 7 to 8 shows that, with the premise that the A/B value satisfies 0.70≤A/B≤1.95, when the amount of the filler is adjusted to 70 to 88 wt %, the coefficient of thermal expansion can be further improved, and the warpage of the resin film can be improved, meaning that the dimensional stability is further improved.

The above examples illustrate the principle and efficacy of the present invention and show the inventive features thereof. People skilled in this field may proceed with various modifications and replacements based on the disclosures and suggestions of the invention as described without departing from the principle thereof. Therefore, the scope of protection of the present invention is as defined in the claims as appended.

What is claimed is:

1. A resin film, which comprises an epoxy resin and a cyanate resin, wherein when the resin film is characterized by Fourier transform infrared spectroscopy (FTIR), the Fourier transform infrared spectrum of the resin film has a signal intensity A from 2205 cm$^{-1}$ to 2322 cm$^{-1}$ and a signal intensity B from 1472 cm$^{-1}$ to 1523 cm$^{-1}$, and 0.70≤ A/B≤1.95.

2. The resin film of claim 1, wherein the Fourier transform infrared spectroscopy is performed as follows by using a Fourier transform infrared spectroscopy instrument: placing the resin film in the Fourier transform infrared spectroscopy instrument, measuring an absorption spectrum in a range from 650 cm$^{-1}$ to 4000 cm$^{-1}$, and using an attenuated total reflectance method to measure the signal intensities A and B, wherein the resolution of the Fourier transform infrared spectroscopy instrument is 1 cm$^{-1}$, the scan number of the spectrum is 12, and the signal intensities are the absorbance at respective wavelengths.

3. The resin film of claim 1, wherein the Fourier transform infrared spectrum of the resin film has a signal intensity C from 2943 cm$^{-1}$ to 2990 cm$^{-1}$, and 0.05≤ C/B≤0.4.

4. The resin film of claim 1, wherein the epoxy resin is an epoxy resin with a conjugated unsaturated bond.

5. The resin film of claim 4, wherein the epoxy resin is an aromatic epoxy resin.

6. The resin film of claim 1, wherein the epoxy resin is selected from the group consisting of bisphenol A epoxy resin, bisphenol F epoxy resin, bisphenol S epoxy resin, phenolic epoxy resin, biphenyl epoxy resin, aralkyl epoxy resin, naphthalene epoxy resin, naphthol epoxy resin, epoxides of condensates of phenol and aromatic aldehyde with phenolic hydroxyl groups, biphenyl aralkyl epoxy resin, fluorene epoxy resin, xanthene epoxy resin, dicyclopentadiene epoxy resin, poly(triglycidyl isocyanurate), and combinations thereof.

7. The resin film of claim 1, wherein the cyanate resin is selected from the group consisting of bisphenol A dicyanate, bisphenol E cyanate resin, bisphenol F dicyanate, bisphenol S dicyanate, phenolic cyanate resin, biphenyl dicyanate, biphenol dicyanate, hexafluoro bisphenol A dicyanate, 2,2-bis(4-cyanate)phenyl propane, 1,1-bis(4-cyanate phenyl methane), bis(4-cyanate-3,5-dimethyl phenyl)methane, 1,3-bis(4-cyanate phenyl-1-(methyl ethylidene))benzene, bis(4-cyanate phenyl)sulfide, bis(4-cyanate phenyl)ether, phenolic cyanate resins containing a dicyclopentadiene structure, and combinations thereof.

8. The resin film of claim 1, which further comprises a filler, and the amount of the filler is 70 wt % to 88 wt % based on the solid content of the resin film.

9. The resin film of claim 8, wherein the filler is selected from the group consisting of silica, aluminum oxide, magnesium oxide, magnesium hydroxide, calcium carbonate, talc, clay, aluminum nitride, boron nitride, aluminum hydroxide, silicon aluminum carbide, silicon carbide, sodium carbonate, titanium dioxide, zinc oxide, zirconium oxide, quartz, diamond, diamond-like carbon, graphite, calcined kaolin, pryan, mica, hydrotalcite, polytetrafluoroethylene (PTFE) powders, glass beads, ceramic whiskers, carbon nanotubes, strontium titanate, and combinations thereof.

10. The resin film of claim 1, which further comprises carbon black.

11. The resin film of claim 1, which further comprises a curing accelerator selected from the group consisting of amine-based curing accelerators, guanidine-based curing accelerators, imidazole-based curing accelerators, and combinations thereof.

12. The resin film of claim 1, wherein the resin film has a thickness of 25 μm to 300 μm.

13. A copper-clad laminate, which comprises a dielectric layer and a copper foil covering a surface of the dielectric layer, wherein the dielectric layer is provided from the resin film of claim 1.

14. A packaging material, which comprises the resin film of claim 1.

* * * * *